_United States Patent Office_

3,801,681
Patented Apr. 2, 1974

3,801,681
3,5-DI-T-ALKYLPHENYL PHOSPHONATES
Martin Grayson, Stamford, Conn., assignor to American Cyanamid Company, Stamford, Conn.
No Drawing. Filed Dec. 14, 1970, Ser. No. 98,118
Int. Cl. C07f 9/40; C08f 45/58
U.S. Cl. 260—953   5 Claims

ABSTRACT OF THE DISCLOSURE

Dialkyl 3,5-di-t-alkylphenyl - 4 - hydroxyphenyl phosphonates are prepared by photochemical reaction of a 2,6-di-t-alkyl-4-halophenol with a trialkyl phosphite. The compounds are additives to polyolefins to inhibit deterioration upon exposure to light and weather.

---

The invention relates to dialkyl 3,5-di-t-alkylphenyl-4-hydroxyphenyl phosphonates and methods for making same. The compounds are useful additives in polyolefin formulations to inhibit polyolefin deterioration upon exposure to light and weather.

Compounds contemplated by the invention have the formula

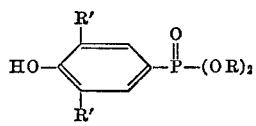

wherein R is selected from alkyl having 1 to 18 carbon atoms, phenyl, hydroxyphenyl and alkyl ($C_1$–$C_{12}$) phenyl, and R' is tertiary alkyl having 4 to 12 carbon atoms.

The compounds of the invention may be prepared by any suitable method but a most preferred process comprises a photochemical reaction of a halophenol having the formula

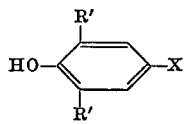

wherein X is halogen selected from fluorine, chlorine, bromine or iodine, and R' is as defined above, with a phosphite having the formula

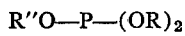

wherein R" is alkyl having 1 to 18 carbon atoms, and R is as defined above.

The 4-halo-2,6-di-(t-alkyl)phenol precursor can be conveniently prepared by reaction of a 2,6-di-t-alkylphenol in an organic solvent such as chloroform with molecular halogen, preferably at a reduced temperature.

EXAMPLE 1

Precursor 4-bromo-2,6-di-(t-butyl)phenol

To a stirred solution of 206 g. (1 mole) of 2,6-di-t-butylphenol in 350 ml. of chloroform there is added 160 g. of bromine at 7–10° C. After repeated washes the mixture is evaporated to a yellow solid. Recrystallization from 90% ethanol gives 206 grams of the product.

Product diethyl 3,5-di-(t-butyl)-4-hydroxyphenylphosphonate

A mixture of 28.5 g. (0.1 mole) of the above-described 4-bromo-2,6-di-t-butylphenol and 66.5 g. (0.4 mole) of triethyl phosphite is irradiated for 94 hours using a cylindrical quartz container of 34 mm. I.D. and 235 mm. long placed in a Rayonet reactor with 2537 angstrom lamps. Reaction temperatures are maintained between 25° and 32° C. and an atmosphere of inert gas (argon) is maintained in the reaction vessel.

The mixture is then stripped by heating at an absolute pressure of 0.25 mm. of mercury to a liquid temperature of 170° C. After cooling, the solid residue is recrystallized from hexane. There is obtained 16.1 g. (47.1% yield) of product melting at 115–116° C.

EXAMPLE 2

Preparation of bis(2-ethylhexyl) 3,5-di-t-butyl-4-hydroxyphenylphosphonate

A solution of 28.5 g. (0.1 mole) of 4-bromo-2,6-di-t-butylphenol in 167.5 g. (0.4 mole) of tris(2-ethylhexyl) phosphite was placed in a 500 ml. fused silica flask which was sealed after being degassed to remove the oxygen. The resulting solution was irradiated with a low-pressure Hanovia mercury lamp for 10 days. The phosphonate ester was isolated by removing the impurities by vacuum stripping. It was identified by infrared analyses.

EXAMPLE 3

Precursor 4-bromo-2,6-di-t-octylphenol

To a solution of 187 g. (0.5 mole) of 2,6-di-t-octylphenol in 310 ml. of chloroform is added 80 g. of bromine at 8–10° C. After the bromination is complete the mixture is washed several times with water and evaporated to dryness. The brominated product is purified by recrystallization from ethanol.

Product dimethyl 3,5-di-t-octyl-4-hydroxyphenylphosphonate

An 82.7 gram portion of the 4-bromo-2,6-di-t-octyl phenol so prepared was mixed with 50 grams of trimethyl phosphite and the mixture was irradiated for 8 days in the same equipment and with the same reaction conditions described in Example 1. The product was stripped at 0.25 mm. mercury absolute pressure and recrystallized from hexane.

EXAMPLE 4

Preparation of dibutyl 3,5-di-t-butyl-4-hydroxyphenylphosphonate

A solution of 28.5 g. (0.1 mole) of 4-bromo-2,6-di-t-butylphenol in 100.1 g. (0.4 mole) of tributyl phosphite was placed in a 500 ml. fused silica flask and degassed to remove the dissolved oxygen. The flask was then sealed, and the resulting solution was irradiated with a low-pressure mercury lamp for 6 days. The dibutyl phosphonate was isolated by distillation at 175–183° under 0.03–0.04 mm. pressure. The yield was 16.7 g. The ester (a very viscous liquid) was identified by IR and NMR analyses.

EXAMPLE 5

Utility

One hundred parts unstabilized polypropylene are dry blended with 0.2 part diethyl 3,5-di-(t-butyl)-4-hydroxyphenyl phosphonate and the mixture is dry milled on a heated two-roll mill until fused. The fused sheet is compression molded into a thin film 16 mils thick. With a control film 11 mils thick made without additive, the film is exposed to ultraviolet radiation in a Fade-O-meter until the films become brittle. The test film is exposed 800–900 hours before becoming brittle as compared with the untreated film which becomes brittle within the first 100 hours. Similarly, dibutyl 3,5 - di - t - butyl-4-hydroxyphenyl phosphonate is tested by the same procedure and the film containing this compound becomes brittle after 900–1000 hours. The compounds of the invention similarly stabilize other polyolefins such as various polyethylenes, other polypropylenes and the like. Stabilizing amounts may range from about 0.05 to about 1.0 part per 100 parts by weight of the polyolefin. The stabilizers are particularly useful for making polyolefin sheets, plates moulded parts, extruded parts and the like intended for use under conditions of exposure to sunlight or ultraviolet radiation.

I claim:
1. A dialkyl 3,5-ditertiarylalkyl-4-hydroxyphenylphosphonate compound of the formula

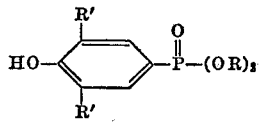

wherein each R' is a tertiary alkyl radical having four to ten carbon atoms and each R is a member of the group consisting of alkyl having 1 to 12 carbon atoms.

2. A compound defined by claim 1 wherein each R' is t-butyl and each R is lower alkyl.

3. Diethyl 3,5-di-t-butyl-4-hydroxyphenylphosphonate.

4. Bis(2-ethylhexyl) 3,5-di-t-butyl - 4 - hydroxyphenylphosphonate.

5. Dibutyl 3,5-di-t-butyl-4-hydroxyphenylphosphonate.

References Cited

UNITED STATES PATENTS 3,335,203  8/1967  Friedrich et al. _____ 260—953
3,534,127  10/1970  Spivack _____ 260—953 XR

FOREIGN PATENTS 1,200,273  7/1970  Great Britain _____ 260—953

ANTON H. SUTTO, Primary Examiner

U.S. Cl. X.R.

260—45.7 P, 45.95, 623 H